US008112377B2

(12) United States Patent
Schmidt (10) Patent No.: US 8,112,377 B2
(45) Date of Patent: Feb. 7, 2012

(54) CLIENT-SIDE RULE ENGINE FOR EXECUTING BUSINESS RULES IN RICH INTERNET APPLICATIONS

(75) Inventor: Kay-Uwe Schmidt, Karlsruhe (DE)

(73) Assignee: SAP AG, Walldorf (DE)

( * ) Notice: Subject to any disclaimer, the term of this patent is extended or adjusted under 35 U.S.C. 154(b) by 937 days.

(21) Appl. No.: 12/120,945

(22) Filed: May 15, 2008

(65) Prior Publication Data

US 2009/0287617 A1 Nov. 19, 2009

(51) Int. Cl.
*G06F 17/00* (2006.01)
(52) U.S. Cl. .................................... 706/47; 709/218
(58) Field of Classification Search ............ 706/4, 47; 709/218; 715/738
See application file for complete search history.

(56) References Cited

U.S. PATENT DOCUMENTS

| 7,945,497 B2* | 5/2011 | Kenefick et al. ............. 705/35 |
| 2006/0075120 A1* | 4/2006 | Smit ............................ 709/227 |
| 2007/0083533 A1* | 4/2007 | Mirkazemi et al. .......... 707/100 |
| 2007/0271367 A1* | 11/2007 | Yardeni et al. ............... 709/223 |
| 2007/0282858 A1* | 12/2007 | Arner et al. .................. 707/10 |
| 2008/0040371 A1* | 2/2008 | Bayyapu et al. ............. 707/101 |
| 2008/0103978 A1* | 5/2008 | Houston ....................... 705/59 |
| 2010/0030718 A1* | 2/2010 | Anderson et al. ............ 706/47 |

OTHER PUBLICATIONS

Tim Wellhausen. Business Logic on the Client-Side. 11th European Conference on Pattern Languages of Programs. Irsee, Germany, Jul. 5, 2006. pp. 1-16.*

Preciado, J.C.; Linaje, M.; Comai, S.; Sanchez-Figueroa, F.; , "Designing Rich Internet Applications with Web Engineering Methodologies," Web Site Evolution, 2007. WSE 2007. 9th IEEE International Workshop on , vol., No., pp. 23-30, Oct. 5-6, 2007.*
JSON.org, "The Fat-Free Alternative to XML". http://web.archive.org/web/20070429091743/http://www.json.org/xml.html, Apr. 29, 2007.*
Kay-Uwe Schmidt et al., "An User Interface Adaptation Architecture for Rich Internet Applications," The Semantic Web: Research and Applications; Springer Berlin Heidelberg, Berlin, Heidelberg, vol. 5021, Jun. 3, 2007, pp. 736-750, XP019075732, ISBN: 978-3-540-68233-2.
Garrett Jesse James, "Ajax: A New Approach to Web Applications," Internet Citation, [online] XP002417065. Retrieved on Jan. 29, 2007. An introduction to the advantages of AJAX over traditional server side processing.
Kay-Uwe Schmidt et al., "On Enriching Ajax with Semantics: The Web Personalization Use Case" The Semantic Web: Research and Applications; Springer Berlin Heidelberg, Berlin, Heidelberg, vol. 4519, Jun. 3, 2007, pp. 686-700, XP019094647, ISBN: 978-3-540-72666-1.

(Continued)

*Primary Examiner* — Jeffrey A Gaffin
*Assistant Examiner* — David H Kim
(74) *Attorney, Agent, or Firm* — Fountainhead Law Group P.C.

(57) ABSTRACT

A client-side business rule engine for executing business rules, at a client, in a rich internet application is disclosed. A set of business rules and a fact base are compiled at a server in accordance with a platform definition model, such that the compiled rules and facts are formatted to conform for use with a business rule engine based on the platform specified in the platform definition model. The business rule engine, embodied in a code module, is served to a requesting web browser application along with a subset of the compiled business rules and facts. At the client, the business rule engine evaluates conditions expressed in the business rules in light of facts received from the server, and facts derived at the client.

19 Claims, 6 Drawing Sheets

OTHER PUBLICATIONS

European Search Report (from a corresponding foreign application), EP 09006548.3, mailed Sep. 17, 2009.

Extended European Search Report (EESR), from a corresponding foreign application, EP 09006548.3, mailed May 27, 2010.

* cited by examiner

CLIENT-SIDE RULE ENGINE FOR EXECUTING BUSINESS RULES IN RICH INTERNET APPLICATIONS

BACKGROUND

The present invention relates generally to rich internet applications. More specifically, the present invention provides a mechanism by which a business rule engine and its associated business rules can be extended to execute on the client-side of a rich internet application.

Figure 1:
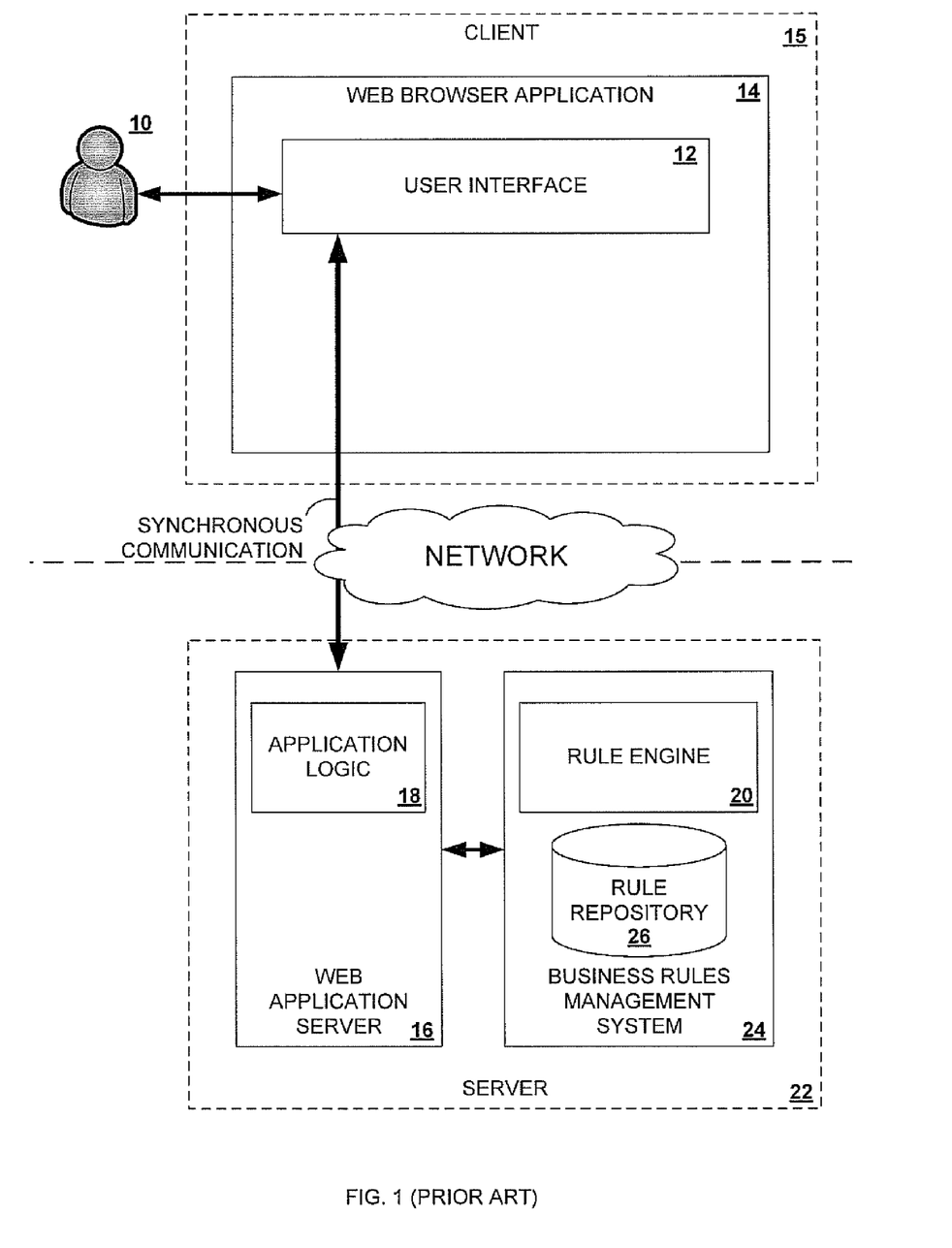
FIG. 1 illustrates a block diagram of various functional components comprising a prior art web-based application for which a business rule engine executes on the server side.

As depicted in FIG. 1, conventional web-based applications that utilize business rules rely on a simple request-response paradigm facilitated by the hypertext transfer protocol (HTTP). A conventional web-based application in this request-response paradigm operates as follows. Generally, a user 10 provides input to the application by manipulating various elements of a user interface 12 of a web page, for example, by filling in a form or selecting an option from a drop-down box. After specifying various inputs, a user "presses" or "clicks" a user interface element (e.g., a submit button), which in turn, causes the web browser application 14 executing on the client 15 to communicate an HTTP request to a web application server 16 executing on a server 22. When received at the web application server 16, the request is processed by application logic 18. If necessary, facts included in the request (e.g., the user input) are relayed to a business rule engine 20 residing on the server 22 by writing the facts to a working memory of a business rule management system 24. Next, business rules 26 are evaluated and those business rules having a condition satisfied by the facts in working memory are executed by the rule engine 20. Data resulting from the execution of rules are communicated back to the web application server 16. In turn, the web application server 16 generates application content based on the data resulting from the rule engine execution, and communicates the application content back to the web browser application 14 via an HTTP response message.

There are a number of problems and/or limitations with rule-based web-applications based on this simple request-response paradigm. First, the server-side business rule engine 20 can only be invoked by an explicit user interaction with a user interface element displayed by the browser application. For instance, the business rule engine 20 can only be triggered to evaluate business rules stored in the business rule repository 26 if, and when, a user "presses" or "clicks" a particular button or link causing an HTTP request to be communicated from the browser application 14 to the web application server 16. Consequently, other user interactions, such as cursor movements, page scrolling, key strokes and so forth, cannot be identified as events for the purpose of triggering the evaluation of the business rule set stored in the rule repository 26 on the server 22. Furthermore, the look and feel of the user interface of a web-application based on this request-response paradigm is generally perceived as being static. User interface elements cannot be dynamically modified or updated as the user interacts with the web application. Instead, the layout and content of the web application are updated only upon receiving a new web page via the HTTP response message. Consequently, not only is there a delay (due to client-server communications) in manipulating user interface elements, it is not possible to manipulate a single user interface element without updating or reloading the entire web page.

A variety of new programming tools and techniques have given rise to a new programming paradigm for web-based applications. Web-based applications in this new programming paradigm are often referred to as rich internet applications (RIA's) due to their enhanced look and feel, which closely resemble the responsive look and feel of the user interface for desktop applications. Although there are a variety of competing technologies and techniques (each with its own name) for creating RIA's, one group of inter-related web development techniques consistent with this new programming paradigm is referred to as Ajax. The term Ajax refers to the seamless combination of three powerful, complementary technologies, including asynchronous communications, JavaScript and extensible markup language (XML). Each of these technologies plays an important role in enabling the enhanced look and feel of RIA's. Asynchronous communication refers to the ability of the web browser application to request and receive "behind the scenes" small amounts of relevant data from a web application server, without having to reload an entire web page. JavaScript is a scripting language enabling the execution of code embedded in a web page by a web browser application. Finally, XML is used for the ad-hoc manipulation of various elements of the user interface of a web page, without having to reload a completely new web page. Using these three technologies, application developers can enhance the user interface of web-based applications by "pushing" the processing associated with various user interface elements to the client, thereby giving the user interface of the web-based application a very responsive and dynamic look and feel.

A web-based application leveraging these new programming tools and techniques may include application logic that executes at the client. The client-side application logic may detect and analyze events as they occur, and in turn, asynchronously communicate messages to a server-side business rules management system, requesting the invocation of a server-side rule engine upon detecting the occurrence of certain events. Although such a web-based application provides several advantages over that of FIG. 1, there are still several limitations and problems with such an application, particularly involving the server-side business rules management system. First, because the business rules and their execution environment still reside exclusively on the server, the web browser application must still contact the rule engine every time a user interacts with a user interface element configured to invoke the evaluation and/or execution of a rule. This means that the user interface can only be manipulated to respond to user input after waiting until the web browser application has completed its communication with the rule engine. This has the unfortunate effect of making the client/server communication perceptible to the user, for example, in the form of a long delay. Furthermore, with the application logic residing on the client, any number of fine grained user actions (e.g., keystrokes, button selections, cursor movements, and so on) can be detected and used to trigger the evaluation of a business rule. However, each event detected at the client must be communicated in a message to the server. This may cause the browser application to continuously communicate a stream of event messages from the web browser application to the business rule management system on the server, which has the undesired effect of increasing the processing load on the server and further increasing the perceived delay in processing user interface events.

SUMMARY

Embodiments of the present invention relate to a client-side rule engine for executing business rules in rich internet applications. In one embodiment of the invention, a fact base and a set of existing business rules are compiled at a server, according to rules, definitions and directives set forth in a platform definition model. The results of this compiling include a pre-compiled platform-specific fact base and business rule set that are suitable for use by a rule engine that executes on a client. More specifically, the pre-compiled platform-specific fact base and business rules are compiled for use by a rule engine executing as an extension of a web browser application that conforms to the platform definition model. After the fact base and business rules have been compiled, a subset of the fact base and a subset of the business rules are sent to a client along with the business rule engine. When received at the client, a web browser application executing at the client operates the business rule engine to evaluate and execute certain business rules. In particular, when the pre-compiled facts sent to the client and any client-side derived facts satisfy a condition of a business rule, the business rule is executed by the business rule engine at the client. Accordingly, user interface elements can be manipulated without the need for requesting or receiving additional data from the server.

In another aspect, the client-side business rule engine implements a RETE algorithm for analyzing facts at the client in order to determine if conditions specified by the business rules are satisfied. If a condition is satisfied, the business rule engine performs an action as specified by the business rule for which the condition was satisfied. In one embodiment of the invention, execution of a business rule may result in the manipulation of a user interface element at the client, without the need of requesting or receiving additional data from a server.

Other aspects of the invention will become apparent from the description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 3A illustrates a representation of a user interface, and FIG. 3B illustrates a representation of a pair of business objects, which both may be implemented with a client-side business rule engine consistent with an embodiment of the invention;

DESCRIPTION

Described herein are techniques for enabling a business rule engine to execute and operate on the client side of a web-based, rich internet application. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

In one aspect, the present invention provides a mechanism by which a business rule engine and its associated business rules can be extended to operate on the client side of a rich internet application. As such, a client-side rule engine, which operates as an extension of, or a plug-in to, a web browser application, is configured to evaluate and execute user interface related business rules at the client. By enabling the execution of business rules at the client, the user is provided with an enhanced and responsive user interface that provides immediate feedback to user-provided input and user-initiated actions.

In general, there are two phases involved in providing a client-side business rule engine for use with an RIA, according to an embodiment of the invention. The first phase can be thought of as the design or design-time phase, during which existing business rules and an existing fact base are conditioned for use with a client-side business rule engine. In one embodiment of the invention, the business rules may be expressed as declarative business rules, having an "IF-THEN" format and specifying both a condition and action to be performed should the condition be satisfied. In the context of a business rule engine, a fact base is the set of facts, assertions, conclusions and useful definitions that are used to match against the IF-parts of declarative business rules. Although not necessary in every implementation of the invention, in one embodiment the business rules may be atomic, such that the rules are independent of one another and pair-wise disjunct.

The second phase is the run-time phase, during which the business rule engine, business rules and an initial fact base are served to a client (e.g., a web browser application). The business rule engine is initially embodied in a code module received at the web browser application. When executed, the business rule engine, which operates as a plug-in to or an extension of the web browser application, evaluates and, if appropriate, executes one or more of the business rules.

Figure 2:
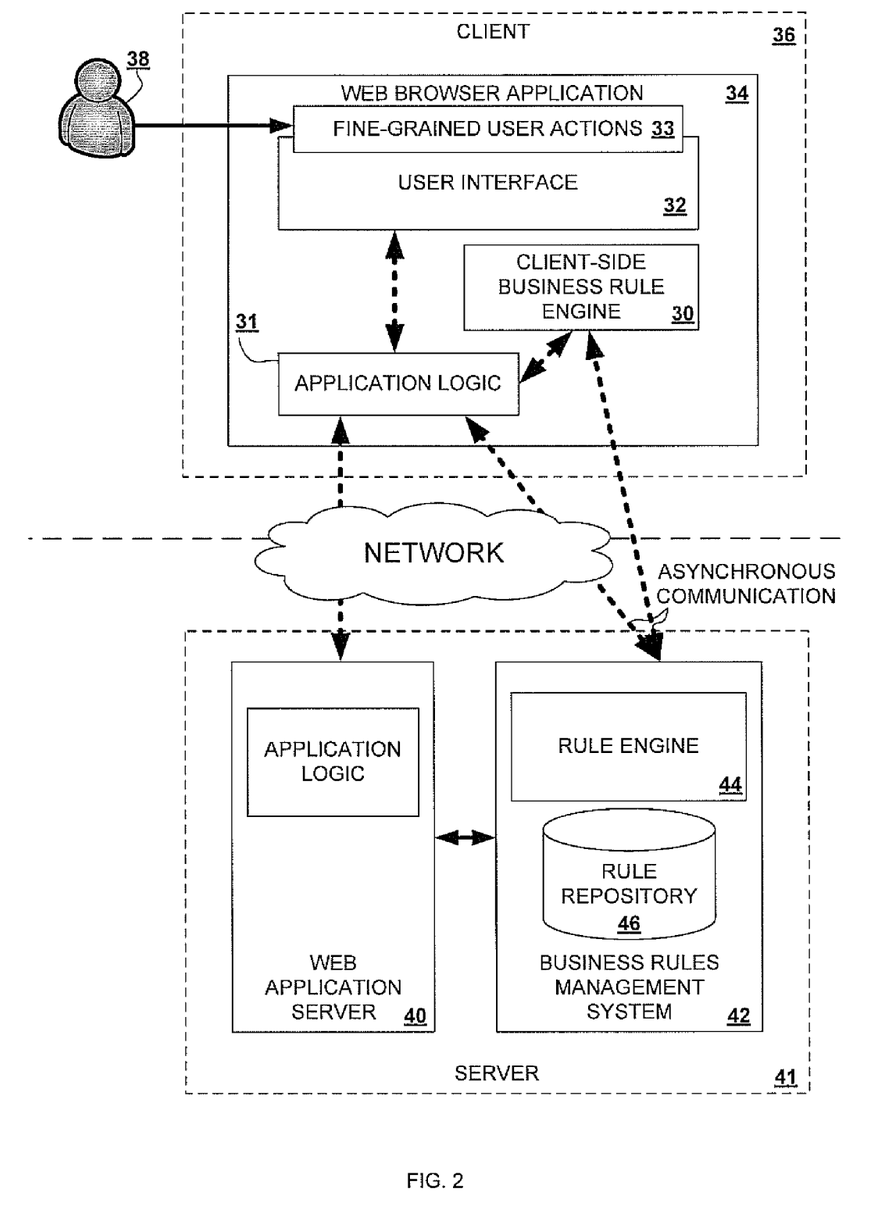
FIG. 2 illustrates a block diagram of various functional components comprising a web-based application having a client-side business rule engine and client-side application logic to perform the necessary processing for manipulating user interface elements, according to an embodiment of the invention.

FIG. 2 illustrates a block diagram of various functional components of a web-based application that utilizes a client-side business rule engine 30 and includes client-side application logic 31 to perform the necessary processing required to manipulate elements of the user interface 32. As illustrated in FIG. 2, a web browser application 34 with a client-side business rule engine 30, client-side application logic 31 and elements of a user interface 32 are shown executing on a client 36. The rule engine 20 and application logic 31 may be implemented using Ajax, such that embedded JavaScript code in the web page is executed by the web browser application 34. As a user interacts with various user interface elements of the user interface 32 events are detected and analyzed by the business rule engine 30 operating on the client. If the facts available for analysis at the rule engine satisfy the condition of a particular rule, an action specified by the rule is performed, resulting in the manipulation or modification of a user interface element, for example. This can be achieved without reloading an entire web page, or requiring additional communication with the server. Advantageously, fine-grained user actions 33 can be detected and utilized as a trigger for evaluating a business rule at the client, without requiring additional client-server communications. Similarly, as a user 38 interacts with various elements of the user interface 32 the application logic 31 may detect the user's interactions and manipulate those, or other, user interface elements without the need for reloading the entire web page. This provides the web-based application with a very responsive user interface. The business rule engine 30 and the client-side application logic 31 may, if necessary, asynchronously request data (e.g., user interface data, business rules, or additional facts) from the web application server 40 or the business rules management system 42 executing on the server 41 so that the requested data is available at the client 36 prior to the time when such data is needed.

Figure 3:
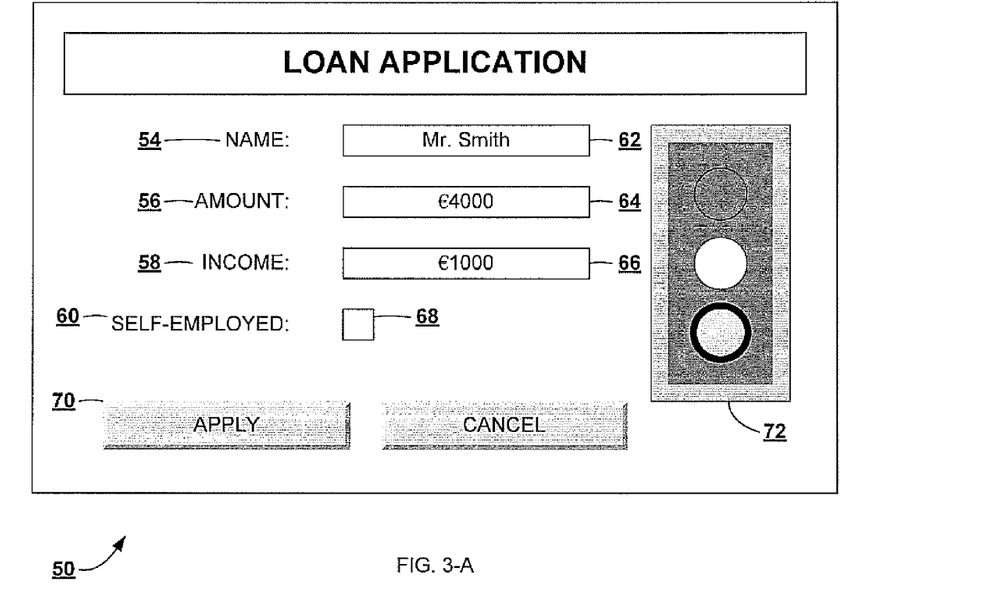

FIGS. 3-A and 3-B illustrate a representation of a user interface 50 and a pair of business objects 52, respectively, for use with a web-based, rich internet application, which may be implemented with a client-side business rule engine consistent with an embodiment of the invention. The user interface 50 and business objects 52 represented in FIGS. 3-A and 3-B are provided as examples for the purpose of conveying a particular use case consistent with one embodiment of the invention. It will be appreciated by those skilled in the art that the example is but one of many applications in which an embodiment of the invention might be implemented and deployed. The user interface 50 of FIG. 3-A represents a user interface for a rich internet application for a loan submission application, which enables a user to submit a loan application to a bank or other financial institution. Accordingly, the user interface shows a form having four fields (e.g., fields 54, 56, 58 and 60) and corresponding data entry boxes (e.g., 62, 64, 66 and 68) for providing user input. In particular, the user interface prompts a user (e.g., a loan applicant) to provide his or her name, a requested loan amount, and the loan applicant's income. In addition, the loan applicant is asked to check a box to indicate if he or she is self-employed.

In a conventional web-based application—based on the HTTP request-response paradigm—a user would need to provide all of the necessary input and then "press" or "select" the "APPLY" button 70 in order to communicate the user input to a web application server in an HTTP request message. Consequently, the user would not be provided any feedback until the user submitted the request to the server, the server processed the request, and the server communicated a response message back to the web browser application.

In contrast to a conventional web-based application, the user interface of a rich internet application having a client-side business rule engine is able to provide immediate feedback in response to user input. For example, in addition to the four input boxes shown in the user interface of FIG. 3-A, there is also shown a user interface element representing a traffic light 72. The individual lights (e.g., red (top), green (bottom), and yellow (middle)) of the traffic light 72 are used to provide immediate feedback to the loan applicant as the loan applicant provides input to the application. For instance, the individual lights indicate to the loan applicant the probability of his or her loan being approved upon submission, given the information the loan applicant has provided. For example, an illuminated red light indicates that the loan application will not be approved. An illuminated yellow light indicates that the loan application is subject to approval upon being reviewed by a loan analyst. Finally, an illuminated green light indicates the loan application will be approved in all probability, when submitted. Although it is necessary in this example for the loan applicant to submit the user input in order to ultimately have his or her loan application considered, the traffic light signals to the loan applicant the likelihood of his or her loan request being accepted without having to officially submit the user input to the server.

The business logic of the RIA for the loan application is well understood by the bank or financial institution offering the rich internet application, and may be in use in a variety of other applications, including desktop applications. Furthermore, because the business logic for the loan application may change frequently (e.g., as interest rates and/or other factors change), the business logic is well suited for implementation in business rules. The business rules shown below declaratively represent the business logic behind the loan application—particularly, the operation of the traffic light 72. The rules are written using the IF-THEN construct, which is a common construct for business rules that is easy to understand.

IF C.income>=€1000 AND NOT C.selfEmployed THEN L.state="accepted"

IF C.income>=€1000 AND C.selfEmployed THEN L.state="to be checked"

IF C.income<€1000 THEN L.state="rejected"

FIG. 3-B illustrates a pair of business objects 52, represented as a class diagram in Unified Modeling Language (UML) format, for use with the RIA with the user interface of FIG. 3-A. Those skilled in the art of software development will recognize the great number of programming languages and technologies, consistent with various embodiments of the invention, which might be used to encapsulate the information portrayed by the UML class diagrams of FIG. 3-B. In general, business objects are objects that encapsulate real world data and business behavior associated with the entities that they represent. Business objects may also be referred to as domain objects when represented in a domain model. In any case, the two business objects 52 illustrated in FIG. 3-B and used in conjunction with the RIA whose user interface is illustrated in FIG. 3-A are "CUSTOMER" and "LOAN-APPLICATION". They are shown connected by the relation "applies-for", which signals a link between one customer and one or more loan applications. The attributes of the customer class store customer specific attributes, such as name, income and employment status, whereas the attributes of the loan class store loan specific data, such as a requested loan amount and approval status. Furthermore, a loan application may take on any of the following three states: accepted, to be checked, or rejected.

The first business rule shown above states that if the loan applicant's income is greater than or equal to one-thousand Euros, and the applicant is not self-employed, then the loan will be granted in all probability. Consequently, the green light will be illuminated. The second rule indicates that if the loan applicant's income is greater than or equal to one-thousand Euros, and the applicant is self-employed, then a loan analyst must manually review the loan applicant's information to determine the status of the loan application. Consequently, a yellow light will be illuminated in the user interface of FIG. 3-A. Finally, the third rule expressed above indicates if the loan applicant's income is less than one-thousand Euros, the loan application will not be granted, and hence, the red light in the traffic light will be illuminated.

Figure 4:
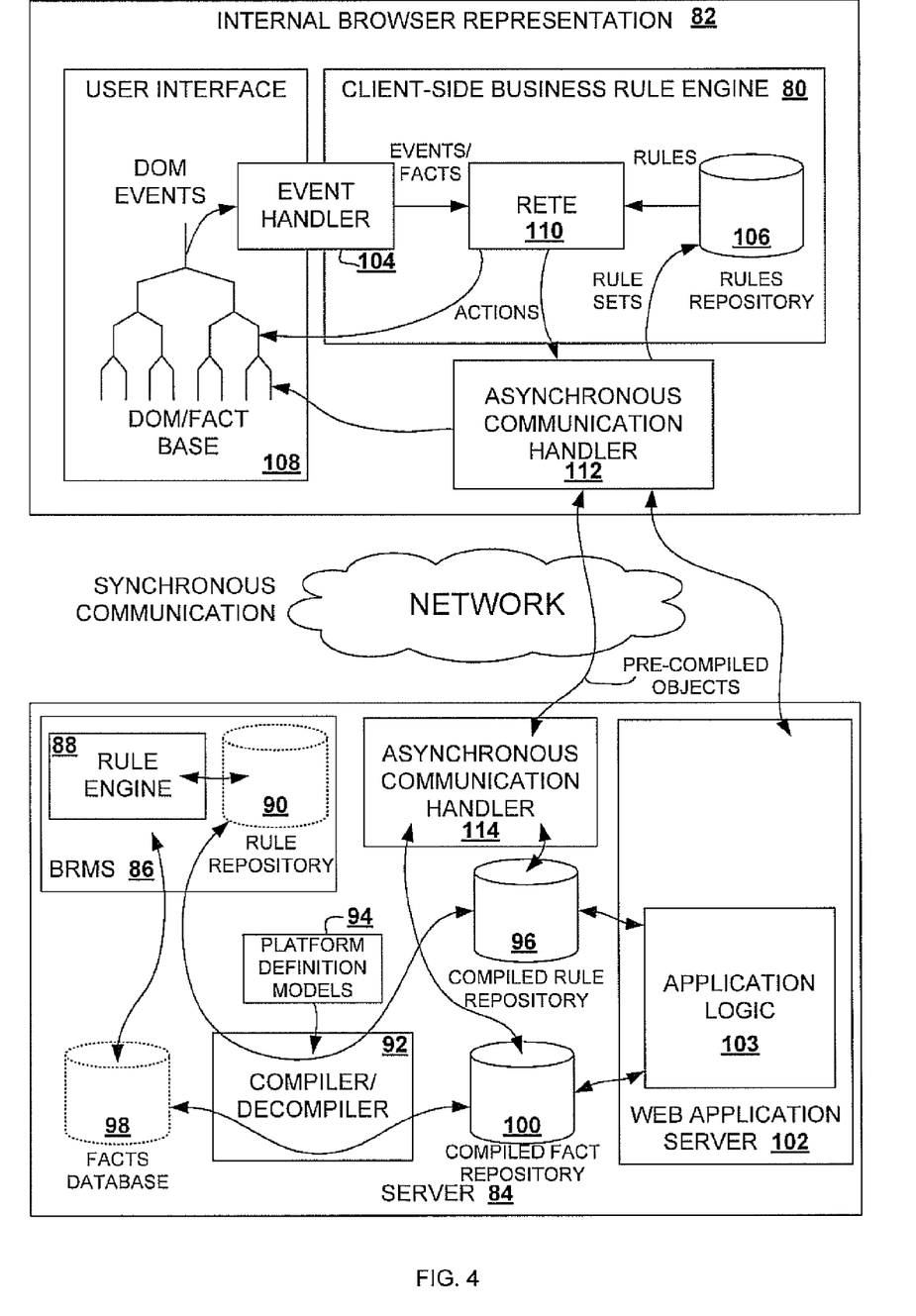
FIG. 4 illustrates an example of a block diagram of various functional components comprising a web-based application having a client-side business rule engine, consistent with an embodiment of the invention.

Turning now to FIG. 4, there is shown a block diagram of various functional components representing a web-based, rich internet application having a client-side business rule engine 80 consistent with an embodiment of the invention. In FIG. 4, the large box with reference number 82 represents the internal components of a web browser application (executing on a client), while the large box with reference number 84 represents a server.

As briefly described above, providing a client-side business rule engine and associated business rules for use in a rich internet application generally involves two phases. During the first phase (e.g., the design phase), existing business rules and facts are compiled in accordance with one or more platform definition models. Compiling the business rules and fact base is necessary in order to translate or convert the existing business rules and fact base into a format that conforms to the format expected by the client-side business rule engine. For example, an organization may currently utilize a number of business rules as part of an existing business rule management system. However, the existing business rules may not be expressed in a format, or embodied in appropriate code modules, for evaluation and execution at a client-side business rule engine that operates as an extension of a web browser application. Consequently, before the business rules can be communicated to a client for evaluation and execution, the business rules must be translated into a format suitable for evaluation and execution by the client-side business rule engine.

Moreover, due to differences, for example, in computer hardware, operating systems and web browser applications, the business rule engine may need to be tailored to operate on a particular target platform. In one embodiment of the invention, multiple business rule engines may be provided, such that each different business rule engine is configured to operate in conjunction with a specific target platform. The web application server responsible for communicating the business rule engine to the client will select the appropriate business rule engine to send based on the attributes of the requesting client. Consequently, the business rules and fact base may need to be translated into several different formats, such that each individual business rule and fact is embodied in more than one code module suitable for use with each supported platform. This translation is achieved by compiling the business rules and fact base in accordance with a platform definition model that specifies the particular format to which each rule and fact is to be translated. Once compiled or translated, the business rules and fact base are stored in a rule repository and fact repository, respectively.

Referring again to FIG. 4, the server 84 is shown to include a business rule management system 86 including a server-side rule engine 88 and a rule repository 90. In addition, the server 84 includes a compiler/decompiler component 92. In one embodiment of the invention, the compiler 92 reads the existing business rules from the rule repository 90 of the server-side business rule management system 86, and compiles the existing business rules in accordance with one or more platform definition models 94. That is, the compiler 92 converts or translates the existing business rules in the rule repository 90 into a format specified by a platform definition model, such that the compiled business rules are suitable for use with a client-side business rule engine that is consistent with the platform definition model. Once compiled, the compiled rules are stored in a compiled rule repository 96. In addition, the compiler 92 translates or converts the fact base in the fact database 98 into a set of compiled facts. As with the business rules, the existing facts 98 are compiled in accordance with a platform definition model 94, and stored in a compiled fact repository 100.

As briefly described above, one set of RIA enabling technologies is referred to simply as Ajax. Accordingly, one platform definition model 94 may specify the particular format to which existing rules and facts are to be converted such that the rules and facts conform to the requirements of a business rule engine based on the Ajax platform. In the case of the Ajax platform, for example, the platform definition model may specify that the business rules and fact base are to be converted to objects consistent with JavaScript Object Notation (JSON). Other RIA enabling technologies (e.g., platforms) include Adobe® Flex®, Microsoft® Silverlight™, and OpenLaszlo™. Accordingly, in one embodiment of the invention, a platform definition model may be defined for each enabling technology, such that the platform definition model for a particular enabling technology specifies the format to which the business rules and fact base must be transformed in order to be operable with a business rule engine implemented with that particular enabling technology. In one embodiment of the invention, a platform definition model may specify that the existing business rules 90 and fact base 98 are to be converted to objects encapsulated in JavaScript Object Notation (JSON), or alternatively, extensible markup language (XML).

Once the existing business rules and fact base are compiled, the web application server 102 and associated application logic 103 are ready to enable the rich internet application by serving the client-side business rule engine 80 and a set of the pre-compiled business rules 96 and facts 100 to a requesting web browser application 82. For instance, during the second phase (e.g., the run-time phase), a user directs a web browser application to request, from a web application server 102, an internet document or web page associated with a rich internet application. The web application server 102 processes the request by assembling the web page and responding to the web browser application 82. Assembling the web page may involve retrieving the appropriate content from a content management system (not shown), and inserting into the web page one or more code modules embodying the business rule engine, initial fact base, and business rules. The client-side business rule engine 80 may be encapsulated in a script that is executable by the requesting web browser application 82. As described above, both facts and rules are compiled on the server (e.g., during the design phase) and only the compiled versions are sent to the client, as fact and rule parsing is time-consuming and thus an expensive operation (in terms of processing time) for the client.

While a user interacts with various elements of the user interface of the rich internet application, the user's interactions are detected by an event handler 104 and are written to a working memory of the client-side rule engine 80. Whenever data (e.g., facts) in the working memory of the business rule engine 80 match the condition part of a business rule or rules in the client-side rule repository 106, the rules are executed and the result can be displayed directly (e.g., by manipulating a user interface element) without contacting the server 84. For instance, the execution of a rule may cause an object in the domain object model 108 to be modified or otherwise manipulated, so as to result in a change to a user interface element displayed by the web browser application. Thus, the time delay caused by client-server communications when the business rule engine operates on the server is avoided, and the user receives immediate feedback to his/her input, thereby giving the rich internet application the look and feel of a desktop application.

In one embodiment of the invention, the client-side business rule engine 80 is configured to analyze business rules based on a version of the Rete algorithm 110, an efficient pattern matching algorithm commonly used for implementing production rule systems. Accordingly, facts derived from user interactions with various user interface elements (e.g., user input), as well as facts received at the browser application 80 from the compiled facts repository 100 of the server 84, are evaluated by the Rete algorithm 110 to determine whether a condition of any rule in the client-side rule repository 106 is satisfied. If satisfied, an action specified by the rule is executed. Such an action may involve updating, or otherwise manipulating an object in the domain object model of the browser application, or alternatively, the execution of a rule action may cause new rules and/or facts to be requested from the server via an asynchronous communication handler 112. For instance, when the execution of a rule changes the status of the rich internet application, a new rule set consistent with the new status may be requested from the server 84 via the asynchronous communication handler 112. Furthermore, when the control flow is given back to the server 84, for example, in order to perform a data intensive operation involving the server-side rule engine 88, new business rules and/or facts may be communicated to the web browser application 82 via the server's asynchronous communication handler 114 at some point before, or when, the control flow is passed back to the web browser application 82.

Although the rule engine 80 might be implemented to evaluate and execute a wide variety of rules, in one embodiment the rule engine 80 is best suited for evaluating and executing rules that are associated with user interface elements whose state is dependent upon user input. For instance, user interface related rules are rules such as the examples provided above in connection with the description of the traffic light of FIG. 3-A. In general, the business rules that are best suited for execution by the client-side business rule engine 80 at the client are those business rules associated with or implementing the presentation logic. For instance, any rule specifying an action for manipulating or modifying a user interface element in response to receiving user input. Although more complex business rules may be evaluated and executed at the client, rules that are heavily dependent upon facts that are not derived at the client will require such facts to be communicated from the server to the client. At some point, for example, when the volume of data required to evaluate a rule is high, the efficiency and advantages gained from executing rules at the client will be lost due to the cost (in terms of processing and communication time) involved in communicating the required facts from the server to the client.

In FIG. 4, the web application server 102, the business rule management system 86 and the compiled rules 96 and facts 100 are all shown to reside on the same server 84. However, in an alternative embodiment of the invention, various functional components may be distributed among multiple servers, such that two or more servers are utilized to facilitate the operations of a rich internet application. For example, in one embodiment, the business rule management system 86 may reside and execute on a server separate from the server on which the web application server 102 resides and executes. Those skilled in the art will appreciate the variety of server configurations that might be implemented consistent with an embodiment of the invention.

Figure 5:
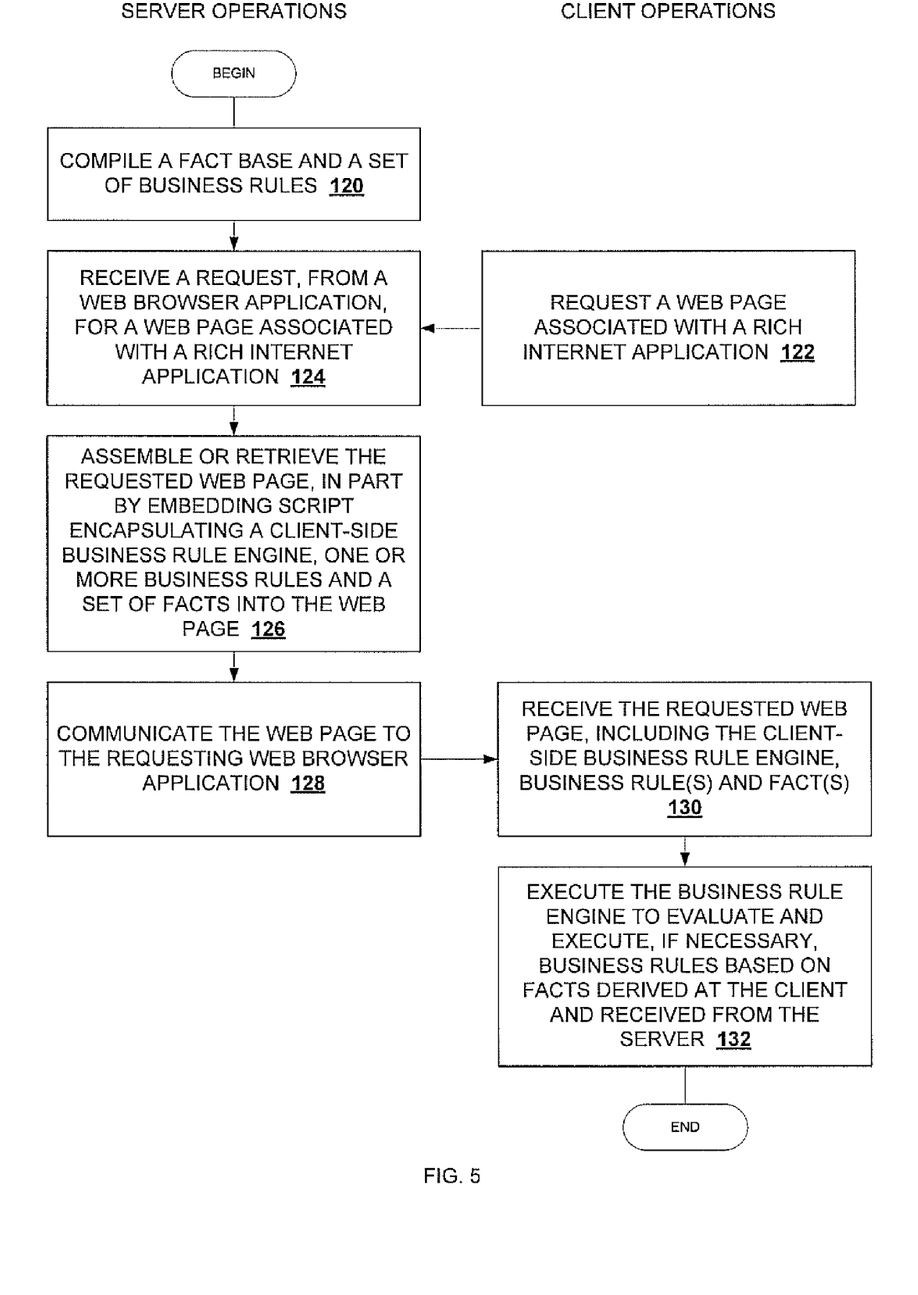
FIG. 5 illustrates an example of a method for providing a rich internet application a client-side business rule engine, consistent with an embodiment of the invention.

FIG. 5 illustrates a method for providing a client-side business rule engine for use in a web-based, rich internet application, according to one embodiment of the invention. At operation 120 the method begins when a server compiles a set of existing business rules and a fact base in accordance with a first platform definition model. Accordingly, method operation 120 results in a pre-compiled platform-specific fact base and a set of pre-compiled platform-specific business rules suitable for evaluation and execution by a client-side business rule engine. The client-side business rule engine is configured to operate as an extension of a web browser application having a platform that is consistent with the first platform definition model. In one embodiment of the invention, method operation 120 may be repeated several times—one time for each platform definition model specified.

Next, at method operation 122, a user of a web browser application directs a web browser to request a web page associated with a rich internet application. For example, a user may enter the uniform resource locator (URL) of a web page associated with a rich internet application. At method operation 124, the request is received at a server computer executing a web application server that is hosting the rich internet application. In response to receiving the request, the web application server assembles the requested web page, for example, by retrieving content from a content management system, and embedding or inserting into the web page one or more code modules encapsulating the client-side business rule engine, one or more business rules and an initial fact base. Then, at method operation 126, the assembled web page is communicated from the web application server to the requesting web browser application (e.g., the client).

At method operation 128, the web page is received at the client. Next, at method operation 130 the web page is rendered, and the embedded code module representing the client-side business rule engine is executed. The code module representing the business rule engine is designed to operate as an extension (sometime referred to as a plug-in) of the web browser application. In any case, facts derived at the client, (e.g., in response to a user interacting with a user interface element) and facts included in the initial fact base received from the server are analyzed by the client-side rule engine to determine whether such facts satisfy the condition(s) of the business rule(s). If and when a rule condition is satisfied, the rule engine will execute the rule by performing an action specified by the rule. Such an action may indicate that a particular user interface object is to be modified, updated or otherwise manipulated. Alternatively, the execution of a rule may result in data being asynchronously communicated to and/or from the server by means of an asynchronous communications handler. As the state of the application changes, and control flow is passed back and forth between the client and the server, the rules and facts may be continuously updated at the client. This allows the user interface of the rich internet application to provide immediate feedback and give a look and feel that is as responsive as a desktop application, regardless of the application state.

In contrast to conventional web-based applications which rely on a simple HTTP request-response paradigm, web-based applications consistent with the invention provide a responsive and dynamic user interface based on the execution of business rules on the client. Furthermore, and advantageously, an organization with an existing investment in a business rule management system can leverage its existing rules by compiling the rules for use with the client-side business rule engine. This allows for rules to be reused in a variety of applications to include both internet- or web-enabled, and so-called offline, or desktop applications.

Figure 6:
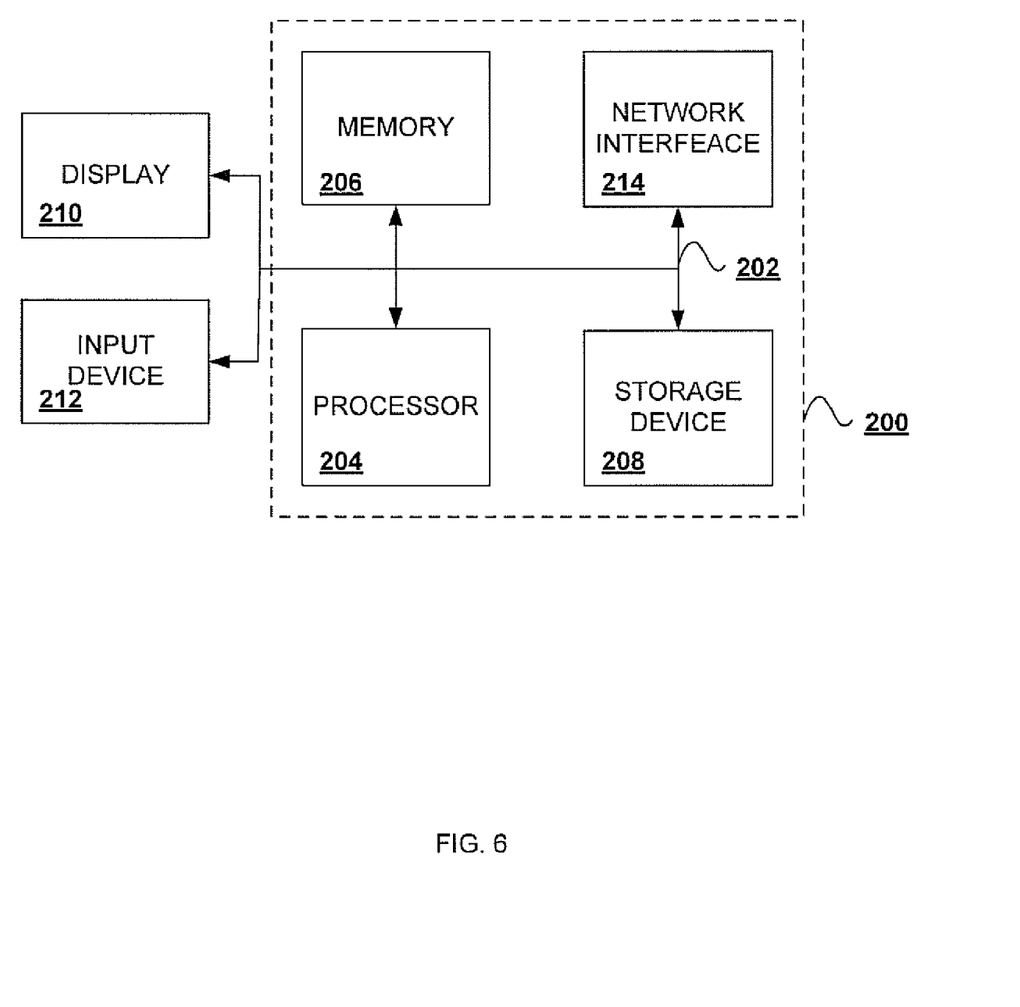
FIG. 6 illustrates a block diagram of the functional components of a representative computer system, on which an embodiment of the invention may reside, execute and operate.

FIG. 6 is a block diagram of an example computer system 200, which might be utilized to implement various embodiments of the present invention. Computer system 200 includes a bus 202 or other communication mechanism for communicating information, and a processor 204 coupled with bus 202 for processing information. Computer system 200 also includes a memory 206 coupled to bus 202 for storing information and instructions to be executed by processor 204, including information and instructions for performing the methods and techniques described above. This memory may also be used for storing temporary variables or other intermediate processing information during execution of instructions to be executed by processor 204. Possible implementations of this memory may be, but are not limited to, random access memory (RAM), read only memory (ROM), or both. A non-volatile mass storage device 208 is also provided for storing information and instructions. Common forms of storage devices include, for example, a hard drive, a magnetic disk, an optical disk, a CD-ROM, a DVD, a flash memory, a USB memory card, a solid state drive or any other medium from which a computer can read. Storage device 208 may include source code, binary code, or software files for performing the methods and/or techniques described above, or for embodying the constructs above, for example.

Computer system 200 may be coupled via bus 202 (or another bus) to a display 210, such as a cathode ray tube (CRT), liquid crystal display (LCD), or organic light emitting diode (OLED) display for displaying information to a computer user. An input device 212 such as a keyboard and/or mouse is coupled to bus 202 for communicating information and command selections from the user to processor 204. The combination of these components allows the user to communicate with the system. In some systems, bus 202 may be divided into multiple specialized buses.

Computer system 200 also includes a network interface 214 coupled with bus 202. Network interface 214 may provide two-way data communication between computer system 200 and a local area network (LAN). The network interface 214 may be a digital subscriber line (DSL) or other modem device to provide a data communication connection over a telephone line, for example. Another example of the network interface is a network interface card (NIC) to provide a data communication connection to a compatible LAN. Wireless communication links may also be established, for example, with a wireless network interface card. In any such implementation, network interface 214 sends and receives electrical, electromagnetic, or optical signals that carry digital data streams representing various types of information.

Computer system 200 can send and receive information, including messages or other interface actions, through the network interface 214 to a private or public intranet or internet. In the internet example, software components or services may reside on multiple different computer systems or servers across the network. A server may transmit actions or messages from one component, through an internet, local network, and/or network interface 214 to a component on computer system 200.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In general, the scope of the invention is defined by the claims and their equivalents.

What is claimed is:

1. A computer-implemented method comprising:
    at a server computer, compiling a fact base and a set of business rules in accordance with a first platform definition model to derive a pre-compiled platform-specific fact base and a set of pre-compiled platform-specific business rules suitable for evaluation and execution by a client-side business rule engine configured to operate as an extension of a browser application consistent with the first platform definition model;
    compiling the fact base and the set of business rules in accordance with a second platform definition model to derive a second pre-compiled platform-specific fact base and a second set of pre-compiled platform-specific business rules suitable for evaluation and execution by a second client-side business rule engine configured to operate as the extension of the browser application consistent with the second platform definition model;
    receiving from the browser application an attribute indicative of one of the first platform definition model and the second platform definition model; and
    communicating to the browser application, in accordance with the attribute, one of the client-side business rule engine and the second client-side business rule engine, a subset of one of the pre-compiled platform-specific fact base and the second pre-compiled platform-specific fact base, and a subset of one of the pre-compiled platform-specific business rules and the second pre-compiled platform-specific business rules, so as to enable the client-side business rule engine to evaluate and execute the subset of the one of the pre-compiled platform-specific business rules and the second pre-compiled platform-specific business rules at a client computer executing the browser application.

2. The computer-implemented method of claim 1, wherein compiling a fact base and a set of business rules in accordance with a first platform definition model includes translating the fact base and the set of business rules from their native server-side declarative format to objects formatted to a specification set forth in the first platform definition model.

3. The computer-implemented method of claim 1, wherein compiling a fact base and a set of business rules in accordance with a first platform definition model includes translating the fact base and the set of business rules from their native server-side format to objects formatted in accordance with JavaScript Object Notation.

4. The computer-implemented method of claim 1, wherein the client-side business rule engine is configured to analyze facts derived at the client computer executing the browser application and facts from the pre-compiled platform-specific fact base in order to evaluate one or more conditions specified in one or more of the pre-compiled platform-specific business rules.

5. The computer-implemented method of claim 4, wherein the client-side business rule engine is configured to execute a particular pre-compiled platform-specific business rule by performing an action specified by the particular pre-compiled platform-specific business rule when a condition specified in the pre-compiled platform-specific business rule is satisfied.

6. The computer-implemented method of claim 1, further comprising:
    communicating to the browser application executing at the client computer application content including one or more user interface elements, wherein user-initiated interaction with a user interface element derives additional facts and/or events for use by the client-side business rule engine when evaluating a pre-compiled platform-specific business rule.

7. The computer-implemented method of claim 1, further comprising:
    after communicating to the browser application the client-side business rule engine, a subset of the pre-compiled platform-specific fact base and a subset of the pre-compiled platform-specific business rules, receiving an asynchronous communication from the browser application requesting additional facts from the pre-compiled platform-specific fact base and/or rules from the pre-compiled platform-specific business rules.

8. The computer-implemented method of claim 7, further comprising:
in response to receiving the asynchronous communication, communicating to the browser application additional facts from the pre-compiled platform-specific fact base and/or rules from the pre-compiled platform-specific business rules.

9. A non-transitory computer-readable medium having instructions stored thereon, which, when executed by a computer, cause the computer to:
compile a fact base and a set of business rules in accordance with a first platform definition model to derive a pre-compiled platform-specific fact base and a set of pre-compiled platform-specific business rules suitable for evaluation and execution by a client-side business rule engine configured to operate as an extension of a browser application consistent with the first platform definition model;
compile the fact base and the set of business rules in accordance with a second platform definition model to derive a second pre-compiled platform-specific fact base and a second set of pre-compiled platform-specific business rules suitable for evaluation and execution by a second client-side business rule engine configured to operate as the extension of the browser application consistent with the second platform definition model;
receive from the browser application an attribute indicative of one of the first platform definition model and the second platform definition model; and
communicate to the browser application, in accordance with the attribute, one of the client-side business rule engine and the second client-side business rule engine, a subset of one of the pre-compiled platform-specific fact base and the second pre-compiled platform-specific fact base, and a subset of one of the pre-compiled platform-specific business rules and the second pre-compiled platform-specific business rules, so as to enable the client-side business rule engine to evaluate and execute the subset of the one of the pre-compiled platform-specific business rules and the second pre-compiled platform-specific business rules at a client computer executing the browser application.

10. The non-transitory computer-readable medium of claim 9, wherein said instructions further cause the computer to:
translate the fact base and the set of business rules from their native server-side declarative format to objects formatted to a specification set forth in the first platform definition model.

11. The non-transitory computer-readable medium of claim 9, wherein said instructions further cause the computer to:
translate the fact base and the set of business rules from their native server-side format to objects formatted in accordance with JavaScript Object Notation.

12. The non-transitory computer-readable medium of claim 9, wherein the client-side business rule engine is configured to analyze facts derived at the client computer executing the browser application and facts from the pre-compiled platform-specific fact base in order to evaluate one or more conditions specified in one or more of the pre-compiled platform-specific business rules.

13. The non-transitory computer-readable medium of claim 12, wherein the client-side business rule engine is configured to execute a particular pre-compiled platform-specific business rule by performing an action specified by the particular pre-compiled platform-specific business rule when a condition specified in the pre-compiled platform-specific business rule is satisfied.

14. The non-transitory computer-readable medium of claim 9, wherein said instructions further cause the computer to:
communicate to the browser application executing at the client computer application content including one or more user interface elements, wherein user-initiated interaction with a user interface element derives additional facts and/or events for use by the client-side business rule engine when evaluating a pre-compiled platform-specific business rule.

15. The non-transitory computer-readable medium of claim 9, wherein said instructions further cause the computer to:
after communicating to the browser application the client-side business rule engine, a subset of the pre-compiled platform-specific fact base and a subset of the pre-compiled platform-specific business rules, receive an asynchronous communication from the browser application requesting additional facts from the pre-compiled platform-specific fact base and/or rules from the pre-compiled platform-specific business rules.

16. The non-transitory computer-readable medium of claim 15, wherein said instructions further cause the computer to:
communicate to the browser application additional facts from the pre-compiled platform-specific fact base and/or rules from the pre-compiled platform-specific business rules, in response to receiving the asynchronous communication.

17. A system comprising:
a server computer having a processor and memory for storing and processing instructions, and a network interface component configured to communicate messages to and from at least a client computer, wherein the server computer includes a compiler component operable to compile a fact base and a set of business rules in accordance with a first platform definition model to derive a pre-compiled platform-specific fact base and a set of pre-compiled platform-specific business rules suitable for evaluation and execution by a client-side business rule engine configured to operate as an extension of a browser application consistent with the first platform definition model,
wherein the compiler component is further operable to compile the fact base and the set of business rules in accordance with a second platform definition model to derive a second pre-compiled platform-specific fact base and a second set of pre-compiled platform-specific business rules suitable for evaluation and execution by a second client-side business rule engine configured to operate as the extension of the browser application consistent with the second platform definition model,
wherein the network interface component is further configured to receive from the browser application an attribute indicative of one of the first platform definition model and the second platform definition model,
wherein the network interface component is further configured to communicate to the browser application, in accordance with the attribute, one of the client-side business rule engine and the second client-side business rule engine, a subset of one of the pre-compiled platform-specific fact base and the second pre-compiled platform-specific fact base, and a subset of one of the pre-compiled platform-specific business rules and the second pre-compiled platform-specific business rules, so as to enable the client-side business rule engine to evaluate and execute the subset of the one of the pre-compiled platform-specific business rules and the second pre-compiled platform-specific business rules at a client computer executing the browser application; and a client computer having a processor and memory for storing and processing instructions, and a network interface configured to communicate messages to and from at least the server computer, wherein the client computer includes a web browser application configured to operate in conjunction with a client-side rule engine received from the server computer, the client-side rule engine operable to analyze facts derived at the client computer and facts received from the pre-compiled platform-specific fact base of the server computer in order to evaluate one or more conditions of a pre-compiled platform-specific business rule received from the server computer.

18. The system of claim 17, wherein the client-side business rule engine evaluates conditions expressed in the pre-compiled platform-specific business rules using a RETE algorithm.

19. A system comprising:

a server computer having a processor and memory for storing and processing instructions, and a network interface component configured to communicate messages to and from at least a client computer, wherein the server computer includes a compiler component operable to compile a fact base and a set of business rules in accordance with a first platform definition model to derive a pre-compiled platform-specific fact base and a set of pre-compiled platform-specific business rules suitable for evaluation and execution by a client-side business rule engine configured to operate as an extension of a browser application consistent with the first platform definition model; and a client computer having a processor and memory for storing and processing instructions, and a network interface configured to communicate messages to and from at least the server computer, wherein the client computer includes a web browser application configured to operate in conjunction with a client-side rule engine received from the server computer, the client-side rule engine operable to analyze facts derived at the client computer and facts received from the pre-compiled platform-specific fact base of the server computer in order to evaluate one or more conditions of a pre-compiled platform-specific business rule received from the server computer, wherein the compiler component is further operable to compile a fact base and a set of business rules in accordance with a second platform definition model, and wherein the network interface is further configured to communicate to a browser application consistent with the second platform definition model i) a version of the client-side business rule engine compatible with the second platform definition model ii) a subset of the pre-compiled platform-specific fact base previously compiled in accordance with the second platform definition model, and iii) a subset of the pre-compiled platform-specific business rules previously compiled in accordance with the second platform definition model, so as to enable the client-side business rule engine to evaluate and execute the subset of pre-compiled platform-specific business rules at a client computer executing the browser application.

* * * * *